July 27, 1937.   E. BAHNSEN   2,088,361
ROTARY COMBUSTION ENGINE
Filed Sept. 12, 1934   2 Sheets-Sheet 1

INVENTOR
ERWIN BAHNSEN.
BY
ATTORNEY

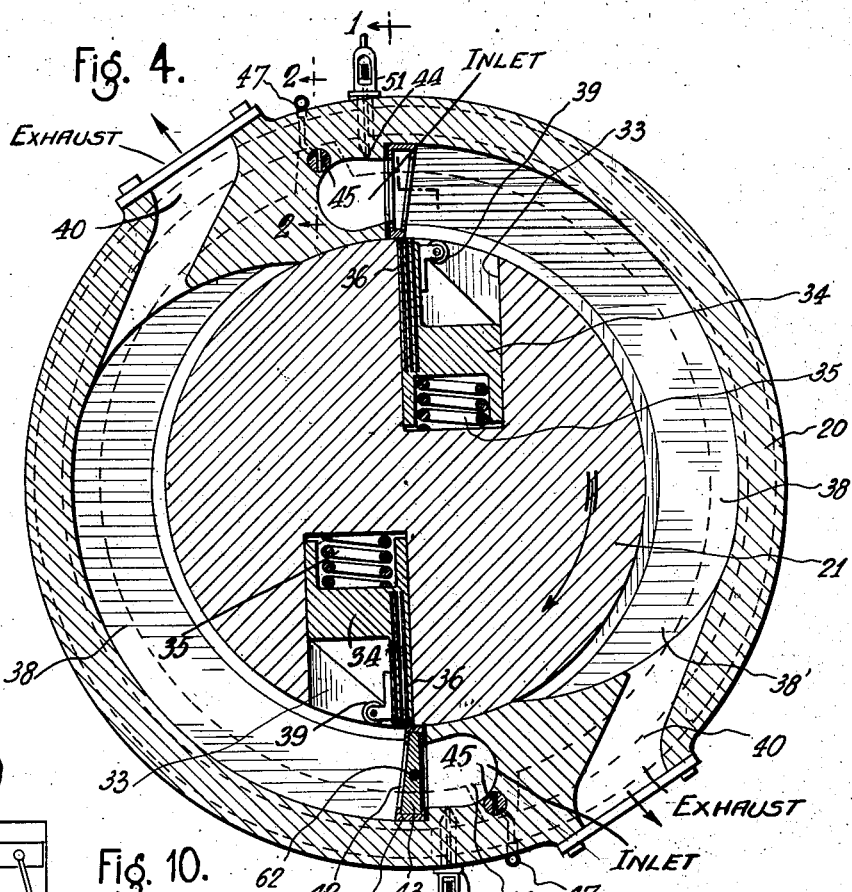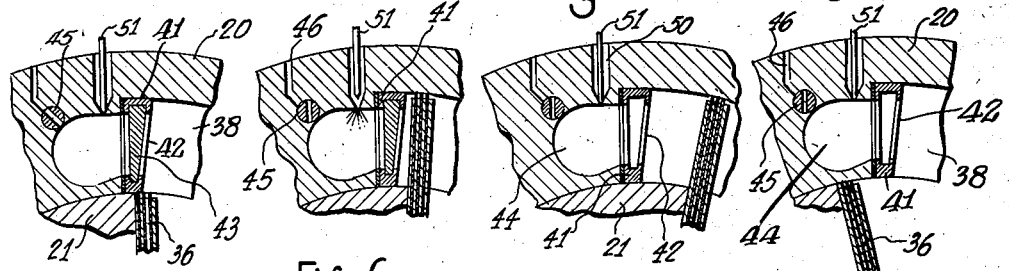

Patented July 27, 1937

2,088,361

UNITED STATES PATENT OFFICE 2,088,361

ROTARY COMBUSTION ENGINE

Erwin Bahnsen, Rockaway Park, N. Y.

Application September 12, 1934, Serial No. 743,708

1 Claim. (Cl. 123—16)

This invention relates to internal combustion engines of the Diesel type, the object being to provide a self-contained, compact engine, adapted to furnish abundant power, and cause but little vibration during operation.

Another object is to provide an engine in which fuel is consumed in a highly economical manner, the energy of each charge being absorbed for power production to its limit through the use of the Diesel cycle.

These advantageous objects, together with others which will become apparent as the description progresses, are attained by the novel construction, combination and arrangement of parts hereinafter described and shown in the accompanying drawings constituting a material component of this disclosure, and in which:—

Figure 4 is a transverse sectional view taken on line 4—4 of Figure 1.

Figure 5 is a fragmentary sectional view showing certain parts in their initial position during a cycle of operation.

Figure 6 is a similar view of the same at the second stage of their movement.

Figure 7 is a like view of the same at a succeeding stage.

Figure 8 is another like view at the final stage.

Figures 9 and 10 show the reciprocating and the rotary engine respectively, comparing their power transmission to the shaft.

Figure 1:
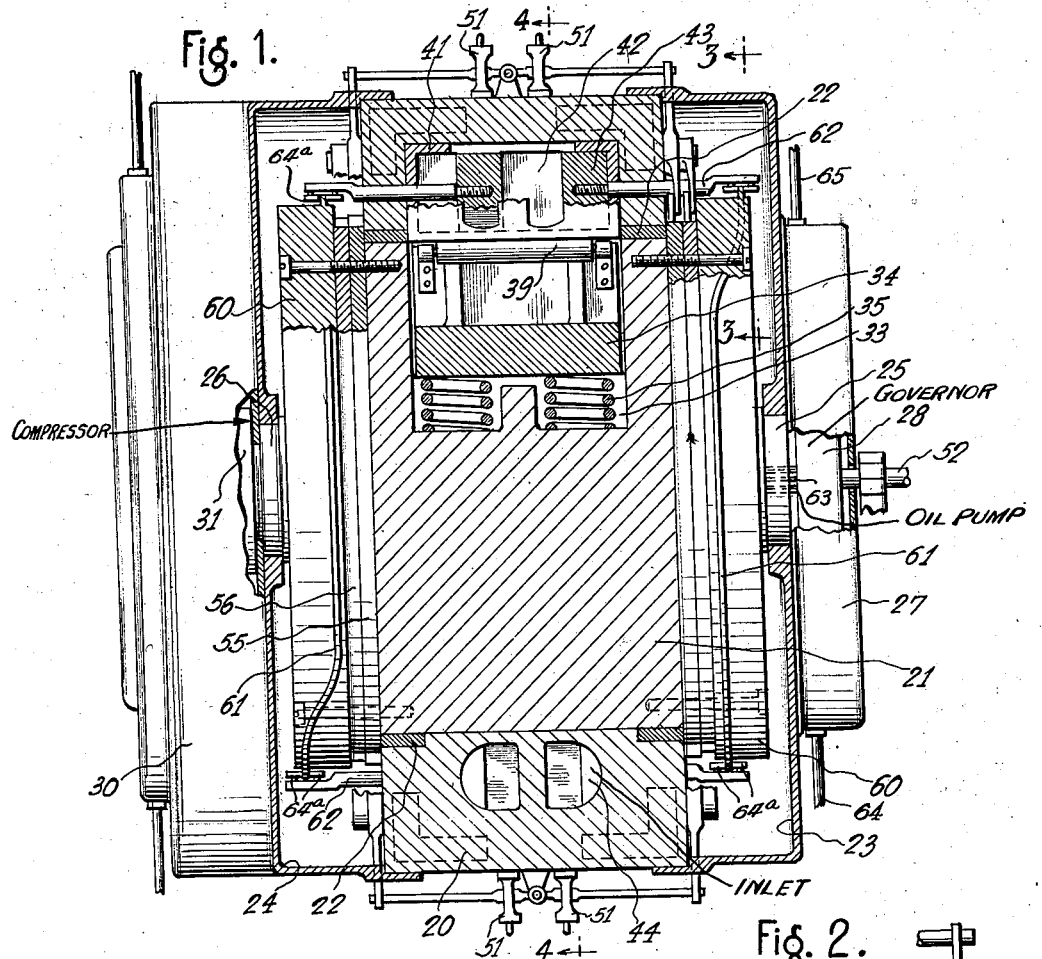
Figure 1 is a longitudinal, sectional view taken on line 1—1 of Figure 4, certain parts being in side elevation.
Figure 2:
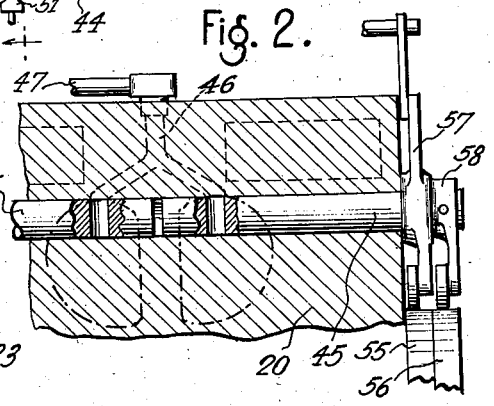
Figure 2 is a fragmentary sectional view taken on line 2—2 of Figure 4, drawn to an enlarged scale.
Figure 3:
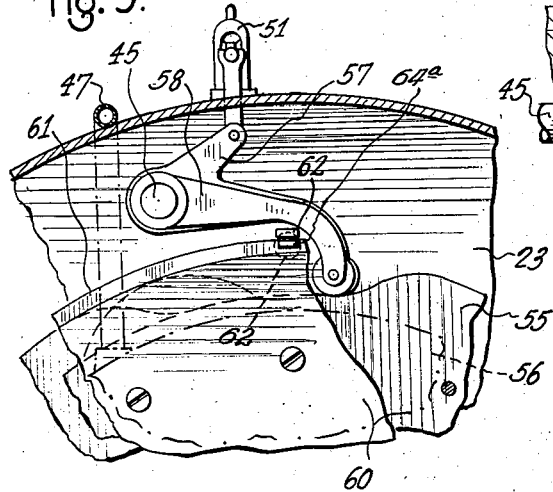
Figure 3 is a fragmentary cross sectional view taken on line 3—3 of Figure 1.

Referring to the drawings in greater detail, the enclosing frame or stator casing of the engine, generally designated by the numeral 20, is approximately cylindrical in outline and is bored axially to receive a rotor 21, the opening being counterbored at its ends for the insertion of packing rings 22. From within this cylinder, in the form of wide grooves, extend two expansion chambers 38, outwardly, each reaching about 90 degrees around the interior of the stator bore and terminating in cycloidal curves, where the outer wall is partly slotted to form exhaust ports 40. The squared ends of the expansion chambers 38 are the starting points from each of which extend two combustion chambers 44. These are separated from the expansion chambers 38 by transverse slide valves consisting of guide members 41, having open passages 42 controlled by axially reciprocating slide plates 43 and their control rods or slide bars 62.

One of the fuel injection valves 51 leads into each of these combustion chambers, while the admission of compressed air through the conduits 46 and a transverse opening in the valve 45 is controlled by short turns of the latter through cam action. All remaining walls around the expansion chambers 38, combustion chambers 44, and exhaust passages 40, may be jacketed for water-cooling purposes.

Secured to the sides of the stator 20 are casings 23 and 24, respectively right and left, enclosing the cam plates 61 and having inreaching hubs bored to contain bearings for the trunnions 25, 26 extending from the sides of the rotor 21.

Attached to the outerside of the casing 23 is a housing 27 containing a combined oil pump 63 and governor 28 having inlet and outlet connections respectively 64 and 65, while on the casing 24 is fixed a housing 30 for an air compressor 31. The oil pump 63 must be one adaptable for the compression rate used in the cycle of operation. The air compressor must develop a pressure of from 500 to 800 lbs. per square inch necessary for the combustion of the highly atomized fuel, in two of the combustion chambers every half revolution.

As both the oil pump and air compressor may be of any approved type, not constituting part of the invention, their details are not given.

The rotor 21 is obviously cylindrical and provided with two like recesses 33 in its opposite sides, central of its width, and offset in such a manner that their rear walls are in alinement with each other in a transverse plane passing through the axis of the rotor.

Fitted to slide in the recesses 33 are vanes 34, pressed outwardly by springs 35, the vanes being provided at their rear edges with a plurality of layered wiping plates 36 movable in such manner as to present their narrow outer ends outwardly to snugly contact the stator bore and the expansion chambers 38 formed therein. Rolls 39 are mounted on the outer end of the vanes 34 to reduce friction when operating.

Flanged directly onto both sides of the rotor are three cam discs 55, 56, 60. Discs 55 are face cams actuating the fuel injection valves 51 through levers 57. Discs 56 are face cams actuating the air admission valves through levers 58 rigidly connected to valves 45. The outer, wider discs 60 have raised cam tracks 61 engaging between rollers 64a on slide bars 62, movable transversely through the stator side walls and abutments 41 and fastened directly to the valve slide plates 43.

The cycle is illustrated by Figures 5, 6, 7 and 8.

During one-half revolution of the rotor 21, one of the two combustion chambers is filled with air obtained from the air compressor, through conduits 47 and 46. Figure 5 shows the air admission valve 45 open with the vane about to pass the guide member and move out into the expansion chamber.

As the vanes 34 pass the guide members, they are forced outwardly by the spring action, while the valves 51 inject a charge of atomized fuel into the air-filled combustion chambers, which is there immediately ignited by the heat of compression within. Just as the vanes 34 completely contact the walls of the expansion chambers and immediately after the injected fuel has been ignited, for which material time must be allowed, and is ready for expansion, the slide valves between the combustion and expansion chambers are opened by the action of the cam disc 60 on the slide valves 43 and the expansive energy does its work on the vanes 34, from there being directly transmitted onto the driving shaft. The vanes are completely sunk into their rotor recesses by gliding the curve at the end of the expansion chambers and the burnt gases escape through exhaust ports 40.

During this one-half revolution the two vanes are acted upon simultaneously in the opposite expansion chambers by the operation of one of the combustion chambers in each. During this cycle the adjoining combustion chambers are filled with air to compression rate, and as the vanes each enter the opposite expansion chambers, the cycle of operation is repeated.

Thus during one complete revolution of the shaft, four propulsive charges act upon the rotor, each vane receiving two power impulses and each of the two combustion chambers ejecting two charges.

The engine may be mounted upon brackets or legs.

The illustration shows two expansion chambers in one stator ring.

Having thus described the engine, what is claimed as new and sought to be secured by Letters Patent is:

A two cycle combustion motor of the Diesel type comprising, in combination, a stator, a rotor therein, a casing secured to each side of said stator and adapted to enclose the rotor, vanes arranged in opposed offset relation in said rotor, combustion and expansion chambers arranged in said stator in substantially tangential relation to said rotor, layered wiping plates on the receding sides of said vanes to contact said chambers, said vanes being resiliently pressed outwardly, rolls on said vanes to contact the walls of said chambers in advance of said plates, axially reciprocating control valves between said chambers, means for admitting fuel and air under compression to said combustion chambers, and means in said casings to actuate and control valves.

ERWIN BAHNSEN.